United States Patent [19]
Chang

[11] Patent Number: 6,155,753
[45] Date of Patent: Dec. 5, 2000

[54] FINE ADJUSTING MECHANISM FOR A CUTTING TOOL

[76] Inventor: Hsin-Tien Chang, No. 21, Lane 85, Yung Feng Road, Taipin City, Taichung Hsien, Taiwan

[21] Appl. No.: 09/353,838

[22] Filed: Jul. 15, 1999

[51] Int. Cl.[7] .................................................. B23C 5/24
[52] U.S. Cl. ............................... 407/92; 407/93; 407/97; 407/103
[58] Field of Search .................... 407/73, 77, 87, 407/67, 70, 71, 92, 93, 102, 36, 37, 45, 74, 85, 95, 97, 78, 103; 408/197

[56] References Cited

U.S. PATENT DOCUMENTS

| | | | |
|---|---|---|---|
| 2,223,831 | 12/1940 | Luers | 407/93 |
| 2,659,962 | 11/1953 | Doerseln | 407/87 |
| 3,205,559 | 9/1965 | Greenleaf | 407/93 |
| 3,296,897 | 1/1967 | Konwal | 407/78 |
| 3,644,050 | 2/1972 | Schiller | 408/197 |
| 4,211,510 | 7/1980 | Hopkins | 407/78 |
| 4,876,932 | 10/1989 | Nessel | 407/102 |
| 5,167,473 | 12/1992 | Barnett | 407/85 |
| 5,217,330 | 6/1993 | Dennstedt | 407/87 |
| 5,536,119 | 7/1996 | Werner et al. | 407/36 |

*Primary Examiner*—William Briggs
*Assistant Examiner*—Erica Ergenbright
*Attorney, Agent, or Firm*—Rosenberg, Klein & Lee

[57] ABSTRACT

A boring cutter assembly with fine adjustment is provided for finely adjusting the diameter of the bore to be formed and for compensating wear of the blade. The boring cutter assembly includes a cutter shaft including a distal end with a cutter seat for receiving a blade. A countersink is defined adjacent to the cutter seat. A bottom wall that defines the countersink includes a screw hole. The countersink and the screw hole together receive an adjusting screw. A first scale is provided on the distal end of the cutter seat and around the countersink. A second scale is provided on the top face of the fine adjusting screw and corresponds to the first scale. A side of the blade that defines a portion of the cutting clearance angle of the blade cooperates with the pitch of the fine adjusting screw, such that the blade is laterally moved when the fine adjusting screw moves vertically as a result of rotation thereof, thereby adjusting the diameter of the bore to be formed.

2 Claims, 16 Drawing Sheets

FINE ADJUSTING MECHANISM FOR A CUTTING TOOL

BACKGROUND OF THE INVENTION

1. Field of the Invention

The present invention relates to a fine adjusting mechanism for a cutting tool, and more particularly to a fine adjusting mechanism for a boring cutter for proceeding with fine adjustment of the diameter of the bore to be formed and for compensating wear in the boring cutter.

2. Description of the Related Art

FIG. 19 of the drawings illustrates a conventional cutting tool having a cutter shaft 10 with an inclined through-hole (not labeled) and a cutter 11 extended through the inclined through-hole and secured in place by screws 12. The cutter shaft 10 is rotated by a main shaft (not shown) of a processing machine (not shown), thereby forming a bore upon rotation of the cutter 11. When adjustment in the diameter of the bore to be formed is required, the screws 12 are loosened, and the cutter shaft 10 is rotated by the main shaft, such that a radius R (FIG. 20) from the tip of the cutter 11 and the axis of the cutter shaft 10 is changed. However, since no scale is provided to assist in the fine adjustment, it takes several times to adjust the radius R to the desired amount. Thus, the fine adjustment is time-consumingand inconvenient.

FIG. 21 of the drawings illustrates an improved boring cutter 20 that uses a screw rod 21 to adjust position of a nut seat 22 to thereby control the magnitude of the radius R (the distance from a tip of a blade 24 provided on a distal end of a cutter arm to the axis of the cutter arm 23). Bore diameter change can thus be completed easily. Nevertheless, the boring cutter 20 is expensive and complicated. If it is required to form a number of bores in a workpiece, a corresponding number of boring cutters are required. In addition, the fine adjustment is achieved by means of providing relative movements between the screw rod 21 and the nut seat 22, yet a clearance exists between the screw rod 21 and the nut seat 22. As a result, the screw rod 21 must be rotated in a reverse direction by a suitable distance before it is rotated in an opposite forwarding direction for eliminating the clearance effect, thereby assuring accuracy in the fine adjustment.

The present invention is intended to provide a fine adjusting mechanism that is simple in structure and that is easy to operate.

SUMMARY OF THE INVENTION

It is a primary object of the present invention to provide a fine adjusting mechanism for a boring cutter for proceeding with fine adjustment of the diameter of the bore to be formed and for compensating wear in the boring cutter.

In accordance with a first embodiment of the invention, a boring cutter assembly with fine adjustment comprises:

a cutter shaft including a distal end with a cutter seat, the cutter seat including a first screw hole, a blade received in the cutter seat and including a conic through-hole, the blade having a clearance angle, a securing screw extended through the conic through-hole of the blade and the first screw hole of the cutter seat for retaining the blade in the cutter seat, the securing screw including a conic neck received in the conic through-hole, a countersink defined adjacent to the cutter seat, a bottom wall that defines the countersink including a second screw hole, a first scale provided on the distal end of the cutter seat and around the countersink, a recess defined between the cutter seat and the countersink, the recess being defined by a wall, a fine adjusting screw mounted in the second screw hole of the countersink, the fine adjusting screw including a groove in an outer periphery thereof, the fine adjusting screw further including a head with a top face, a second scale provided on the top face of the fine adjusting screw and corresponding to the first scale, and a gasket received in the groove of the fine adjusting screw, the gasket being a substantially C-shape ring-like resilient member with a thickness, the ring-like member extending over a half of a circle, the gasket being resiliently inserted into the groove of the fine adjusting screw, the gasket including an inclined face that has an inclination angle the same as the clearance angle of the blade, the inclined face of the gasket including a stop extended therefrom, the stop abutting against the wall that defines the recess, thereby preventing rotation of the gasket.

In accordance with a second embodiment of the invention, a boring cutter assembly with fine adjustment comprises:

a cutter shaft including a distal end with a cutter seat, the cutter seat including a first screw hole, a blade received in the cutter seat and including a conic through-hole, the blade further including a clearance angle and a side, a securing screw extended through the conic through-hole of the blade and the first screw hole of the cutter shaft for retaining the blade in the cutter seat, the securing screw including a conic neck received in the conic through-hole, and a countersink defined adjacent to the cutter seat, a bottom wall that defines the countersink including a second screw hole, a first scale provided on the distal end of the cutter seat and around the countersink, a recess defined between the cutter seat and the countersink, the recess being defined by a wall, a fine adjusting screw mounted in the second screw hole of the countersink, the fine adjusting screw further including a head with a top face, the head of the fine adjusting screw abutting against the side of the blade such that the blade is moved laterally by the head of the fine adjusting screw when the fine adjusting screw is rotated and thus elevated upward, and a second scale provided on the top face of the fine adjusting screw and corresponding to the first scale.

In accordance with a third embodiment of the invention, a boring cutter assembly with fine adjustment comprises:

a cutter shaft including a distal end with a cutter seat, the cutter seat including a screw hole, a blade received in the cutter seat and including a conic through-hole, the blade further including a clearance angle, a securing screw extended through the conic through-hole of the blade and the screw hole of the cutter seat for retaining the blade in the cutter seat, the securing screw including a conic neck received in the conic through-hole;

a countersink defined adjacent to the cutter seat, a bottom wall that defines the countersink including a hole, a first scale provided on the distal end of the cutter seat and around the countersink, a recess defined between the cutter seat and the countersink, the recess being defined by a wall, an adjusting pin mounted in the hole of the countersink, the adjusting pin further including a head with a top face and a shank extending from the head, the shank having an axis, the head having an axis that is offset from the axis of the shank, the head of the adjusting pin abutting against the blade, wherein when the adjusting pin is rotated, relative position between the blade and the head of the adjusting pin is changed such that the blade is moved laterally, and a second scale provided on the top face of the fine adjusting screw and corresponding to the first scale.

The cutter shaft may include a plurality of stepped sections each having a cutter seat for receiving a cutter by means of a securing screw. A fine adjusting screw is mounted adjacent to each blade seat for finely adjusting the blade, thereby providing a tool for boring a bore with a plurality of stepped portions.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
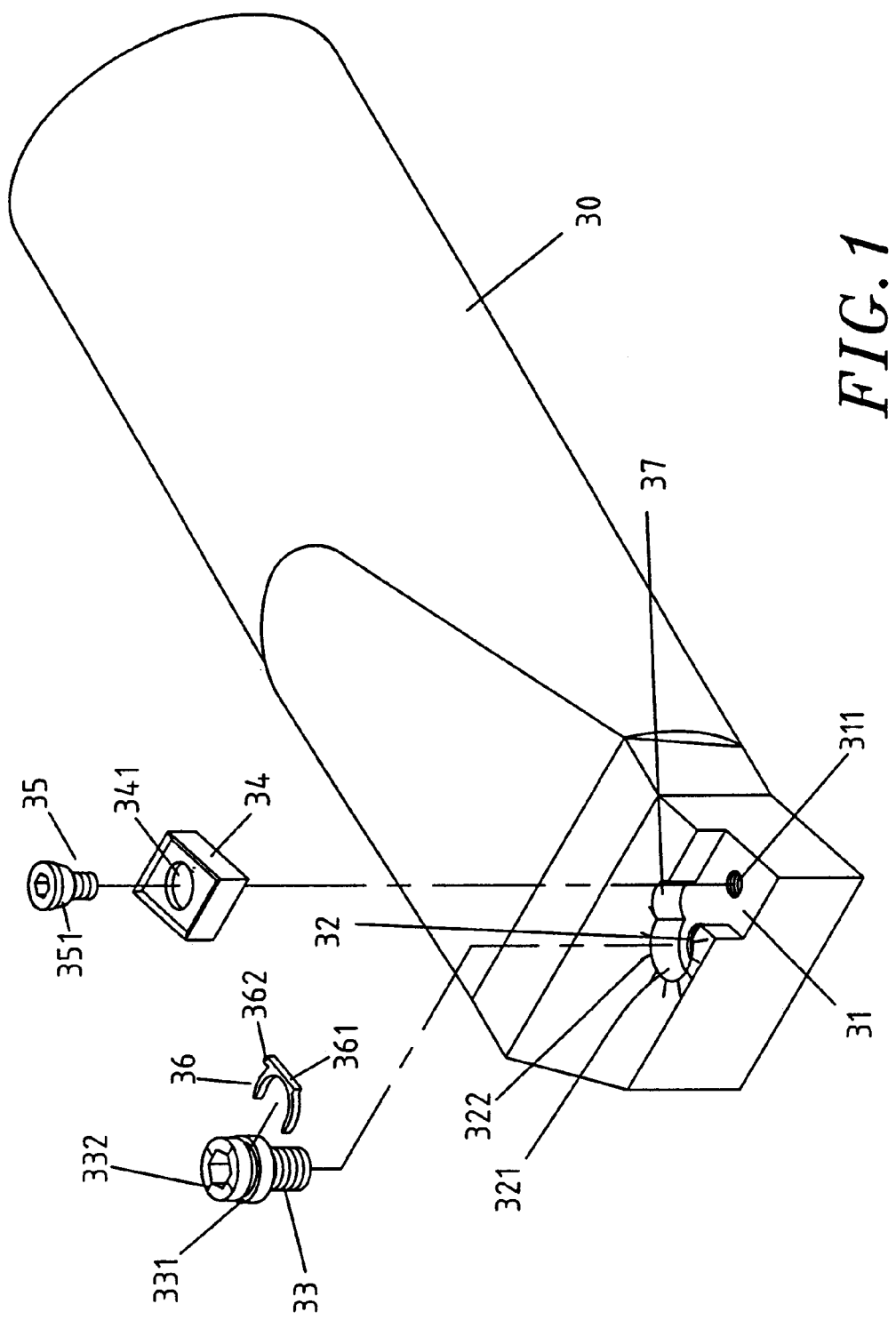
FIG. 1 is an exploded perspective view of a boring cutter with a fine adjusting mechanism in accordance with the present invention.
Figure 2:
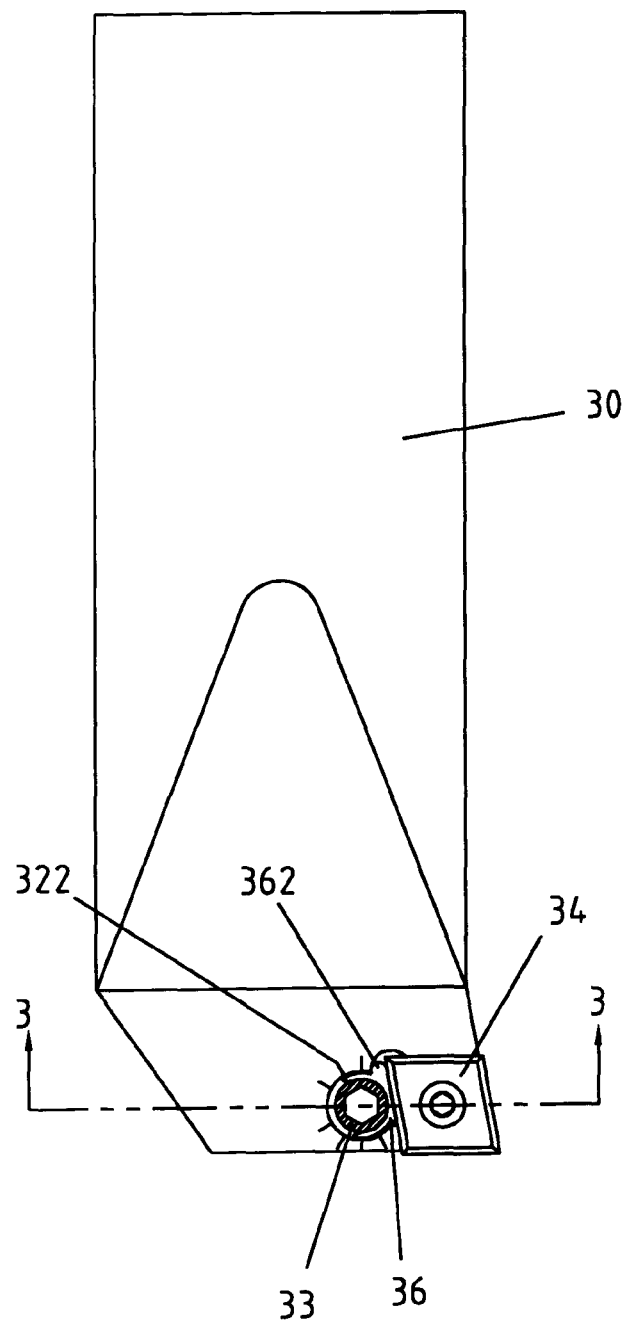
FIG. 2 is a plan view of the boring cutter with the fine adjusting mechanism in accordance with the present invention.

Referring to FIGS. 1 through 18 and initially to FIGS. 1 and 2, a boring cutter in accordance with the present invention generally includes a cutter shaft 30 having a cutter seat 31 formed on a distal end thereof for mounting a blade 34 thereon. The blade 34 includes a conic through-hole 341. A screw hole 311 is defined in the cutter seat 31. A securing screw 35 is extended through the conic through-hole 341 and the screw hole 311 in the cutter seat 31, thereby securing the blade 34 to the securing screw 35. The securing screw 35 includes a conic neck 351 that is received in the conic through-hole 341 of the blade 34.

Figure 5:
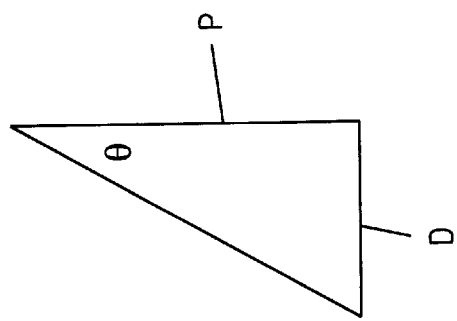
FIG. 5 is a schematic diagram illustrating relationship between a fine adjusting screw and the blade.

Adjacent to the cutter seat 31, a countersink 321 is defined in the distal end of the cutter shaft 30 and has an open side portion in open communication with the cutter seat 31. A bottom wall that defines the countersink 321 includes a screw hole 32 for engaging with a threaded section (not labeled) of a fine adjusting screw 33. A top face of the distal end of the cutter shaft 30 has a scale 322 that is annularly distributed along the countersink 321. The fine adjusting screw 33 includes a scale 332 on a top face of a screw head (not labeled) thereof and an annular groove 331 in an outer periphery of the screw head. A gasket 36 is partially received in the annular groove 331. In this embodiment, the gasket 36 is a substantially C-shape ring-like member with a certain thickness. The ring-like member extends over a half of a circle and has proper resiliency. The gasket 36 further includes an inclined face 361 that has an inclination angle the same as a clearance angle θ of the blade (FIG. 5). The inclined face 361 has a stop 362 (FIG. 1) extended therefrom. The stop 362 bears against a peripheral wall defining a recess 37 between the cutter seat 31 and the countersink 321, thereby preventing rotation of the gasket 36.

Figure 3:
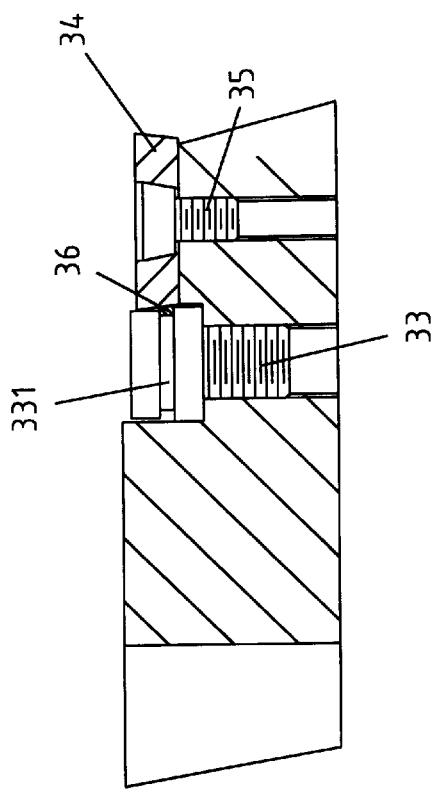
FIG. 3 is a sectional view taken along line 3–3 in FIG. 2.
Figure 9:
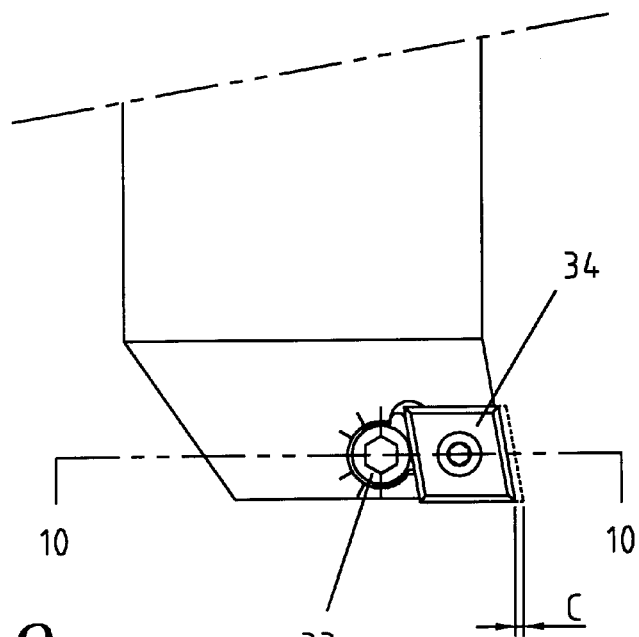
FIG. 9 is a partial view of the boring cutter, illustrating position of the fine adjusting screw and the blade after fine adjustment.
Figure 10:
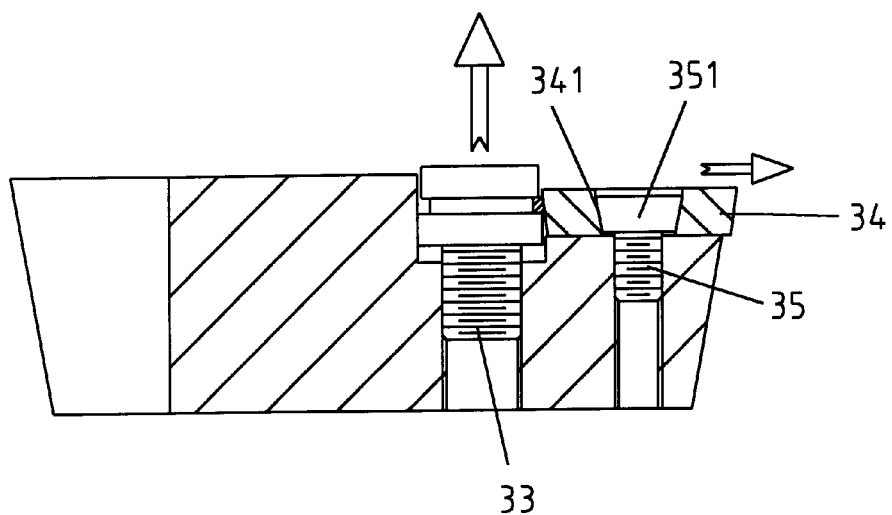
FIG. 10 is a sectional view, in an enlarged scale, taken along line 10—10 in FIG. 9.

Referring to FIGS. 2 and 3, the gasket 36 is resiliently inserted into the groove 331 of the fine adjusting screw 33 in a rotatable manner with the inclined face 361 being in surface contact with a side of the blade 34 that defines a portion of the clearance angle θ of the blade 34. When the fine adjusting screw 33 is rotated and thus moves upward, the gasket 36 does not rotate, as the gasket 36 abuts against the blade 34 and the stop 362 abuts against the wall defining the recess 37. Instead, the gasket 36 moves upward together with the fine adjusting screw 33, as shown in FIGS. 9 and 10. Thus, the blade 34 is moved laterally and thus causes a change in the diameter of the bore to be formed.

Figure 4:
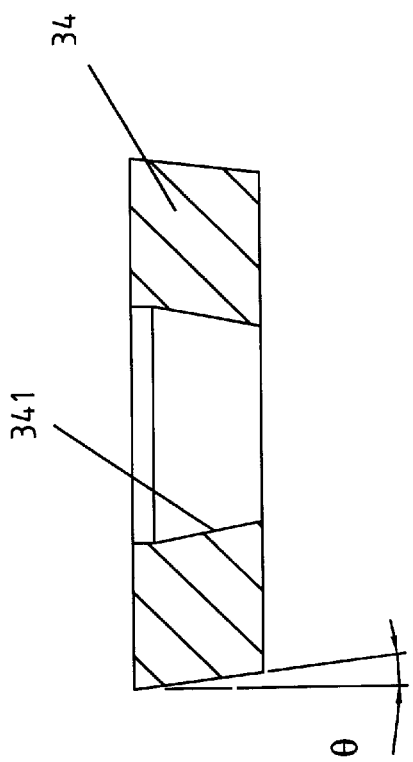
FIG. 4 is a sectional view of a blade of the boring cutter.

Referring to FIG. 4, the cutting edge of the blade 34 has a clearance angle θ (e.g., 7°). If the fine adjusting screw 33 has a specification of M3×0.5 (i.e., the pitch P=0.5 mm), when the fine adjusting screw 33 is rotated through 360° (i.e., travelling through a pitch P), the blade 34 is displaced by a distance D (see FIG. 5). In this embodiment, the traveled distance D of the blade 34=P×tan θ. Namely, D=0.5×tan 7°=0.06 mm. The diameter of the bore to be formed is changed by 0.12 mm (0.06 mm×2). If the scale 332 of the fine adjusting screw 12 is divided by twelve (12) sections, the boring amount for each section is 0.01 mm. Thus, when the fine adjusting screw 33 is rotated through a scale section, the diameter of the bore to be formed is increased or decreased by 0.01 mm.

Figure 6:
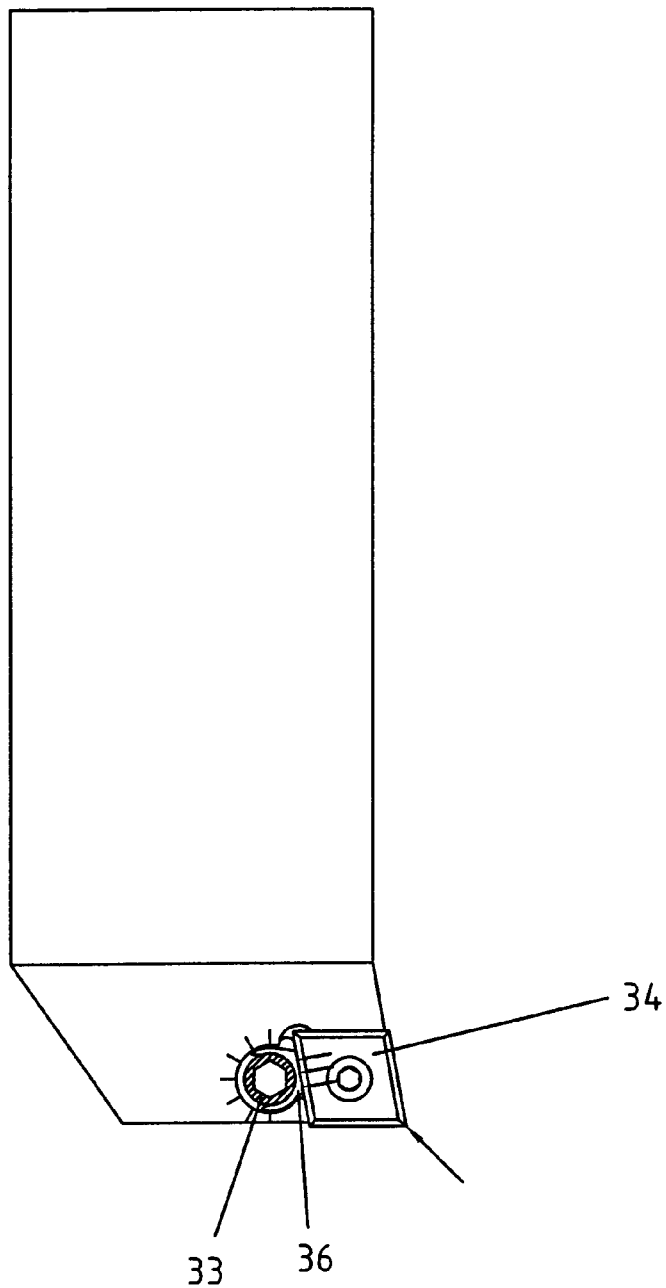
FIG. 6 is a plan view of the boring cutter.
Figure 6A:
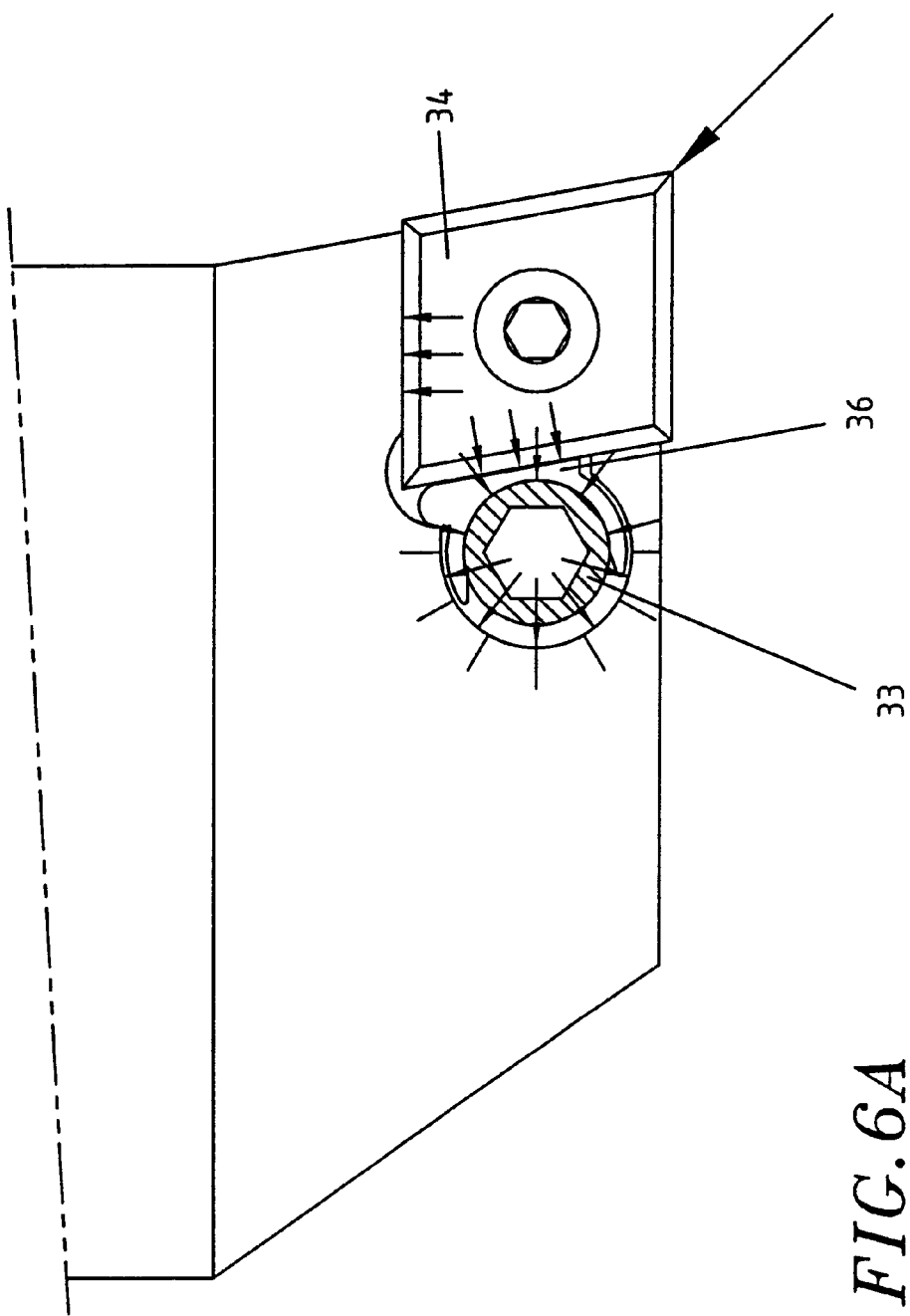
FIG. 6A is an enlarged plan view, partly sectioned, of a portion of the boring cutter, illustrating the force diagram of the blade during cutting.

Referring to FIG. 6 and FIG. 6A, when the blade 34 is subjected to a force during cutting, a portion of the cutting force acting on the blade 34 is transmitted to the main body of the fine adjusting screw 33 via the gasket 36. The area of the inclined face 361 may against the cutting force between the fine adjusting screw 33 and the blade 34, thereby reducing the stress. Thus, the fine adjusting screw 33 and the blade 34 will not deform, as they are durable to the cutting stress. Accordingly, accuracy in the fine adjustment of the blade 34 by the fine adjusting screw 33 is assured without causing error.

Figure 7:
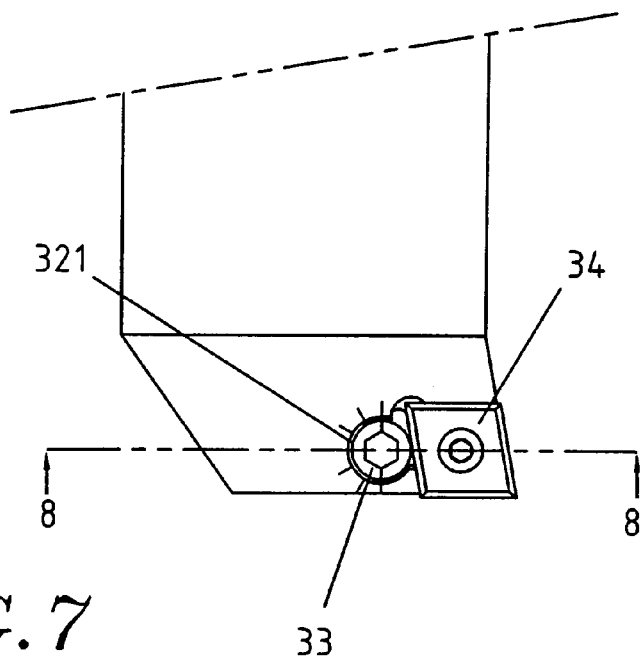
FIG. 7 is a partial view of the boring cutter, illustrating position of the fine adjusting screw and the blade before fine adjustment.
Figure 8:
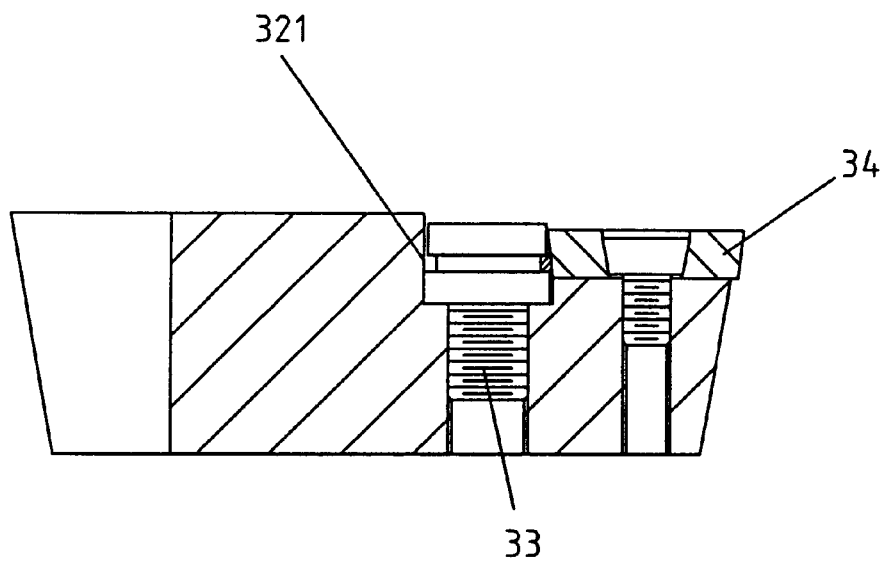
FIG. 8 is a sectional view, in an enlarged scale, taken along line 8—8 in FIG. 7.

Referring to FIGS. 7 and 8, the diameter of the bore to be formed has a smallest magnitude when the fine adjusting screw 33 is "sunk" into a bottom of the countersink 321. Referring to FIGS. 9 and 10, the bore diameter to be formed by the blade 34 is increased by 0.12 mm when the fine adjusting screw 33 is rotated through 360°. The gasket 36 urges the blade 34 to move laterally by a dimension "C". The blade 34 is retained in place by the securing screw 35, and the conic through-hole 341 of the blade 34 engages with the conic neck 351 of the securing screw 35, thereby reliably positioning the blade 34.

Figure 11:
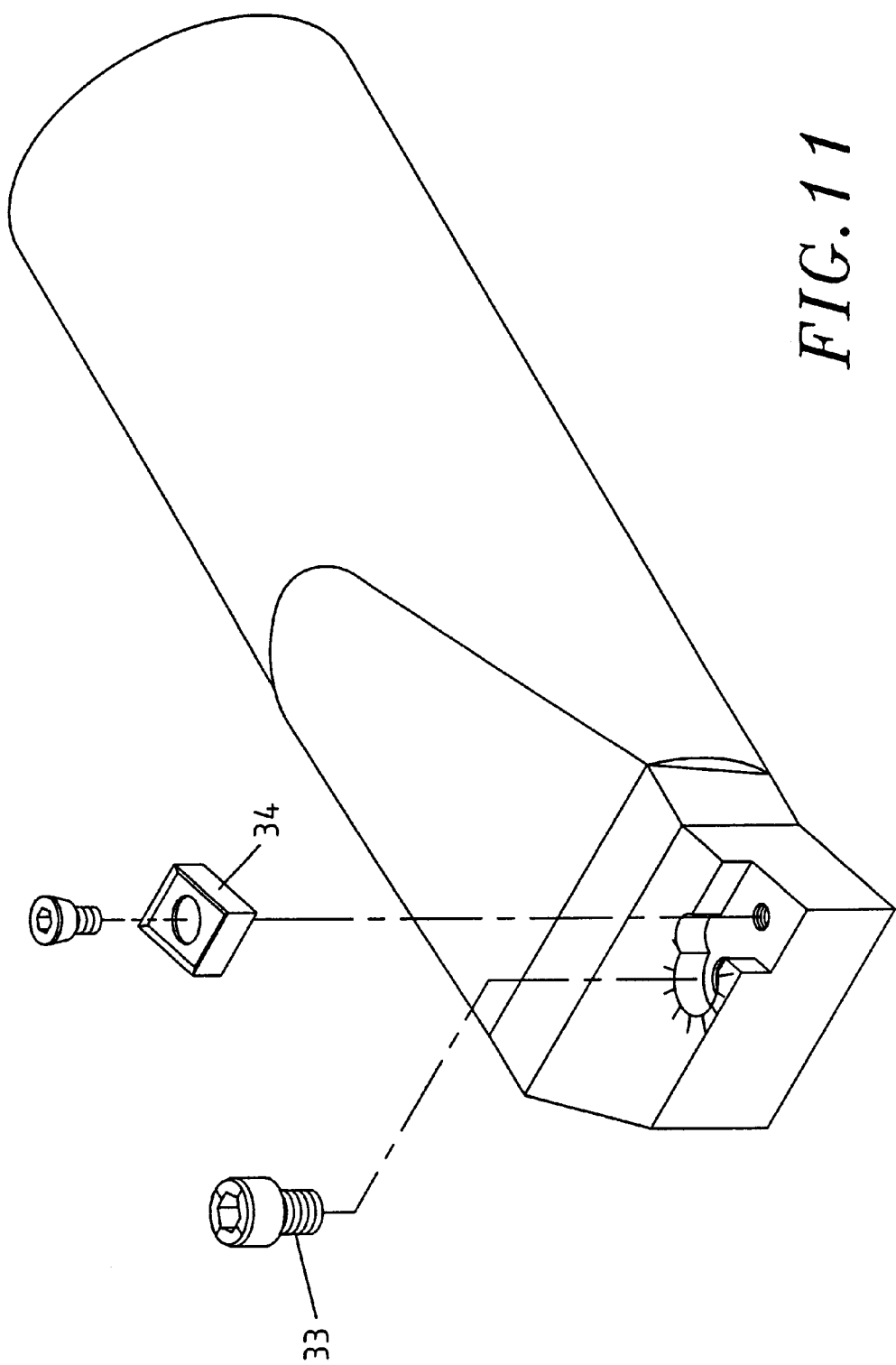
FIG. 11 is an exploded perspective view illustrating a modified embodiment of the boring cutter, wherein the fine adjusting screw is replaced by a screw with a smooth head.
Figure 12:
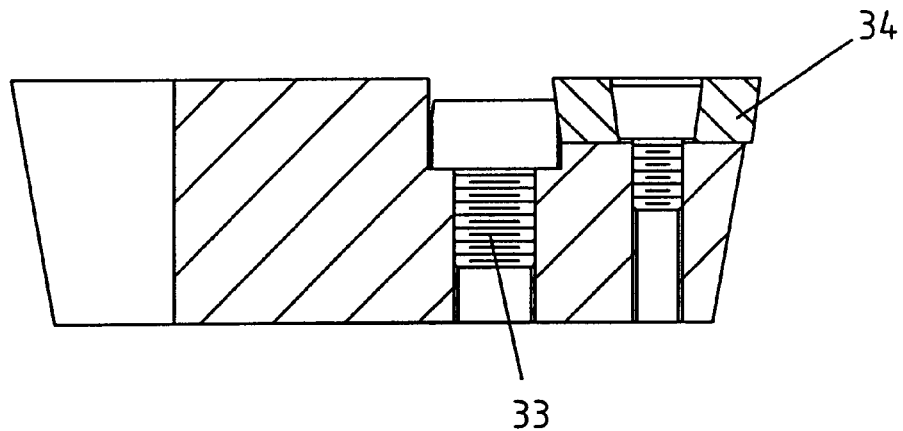
FIG. 12 is a sectional view of the boring cutter in FIG. 11.

FIGS. 11 and 12 illustrate a modified embodiment of the fine adjusting screw 33, wherein the screw head of the fine adjusting screw 33 is smooth (the annular groove neck is eliminated) and directly engages with a side of the blade 34. The screw head directly urges the blade 34 laterally when the fine adjusting screw 33 is rotated and thus elevated vertically.

Figure 13:
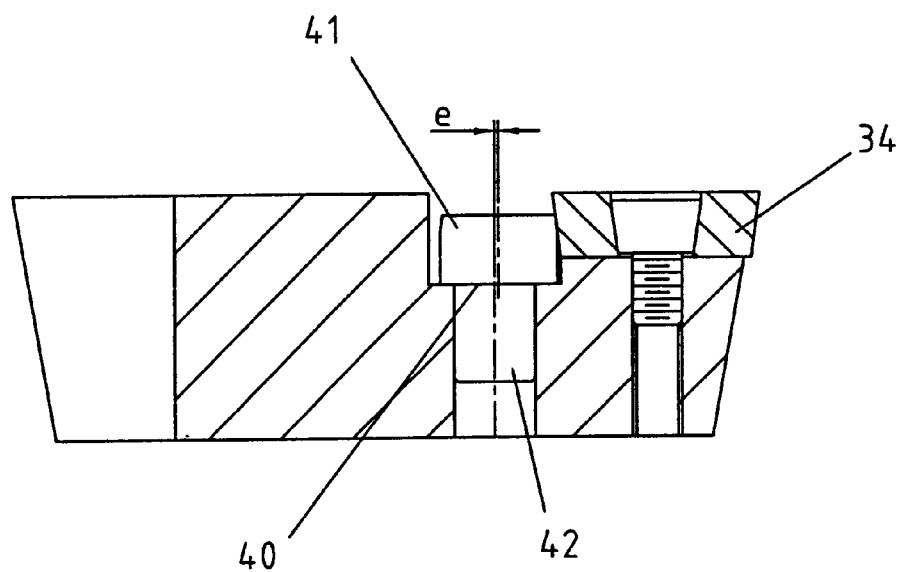
FIG. 13 is a sectional view similar to FIG. 12, illustrating a modification of the boring cutter, wherein the fine adjusting screw is replaced by an eccentric adjusting pin.

FIG. 13 illustrates a further modified embodiment of the invention, wherein the fine adjusting screw 33 is replaced by an eccentric adjusting pin 40 having a pinhead 41 and a shank 42. The axis of the pinhead 41 is offset from the axis of the shank 42 by an amount of "e". A scale may be provided on top face of the pinhead 41. When the pin 40 is rotated, engaging relationship between the pinhead 41 and the blade 34 is changed. Thus, the blade 34 is displaced laterally under cooperation by the securing screw 35, thereby achieving the purpose of changing the diameter of the bore to be formed.

Figure 14:
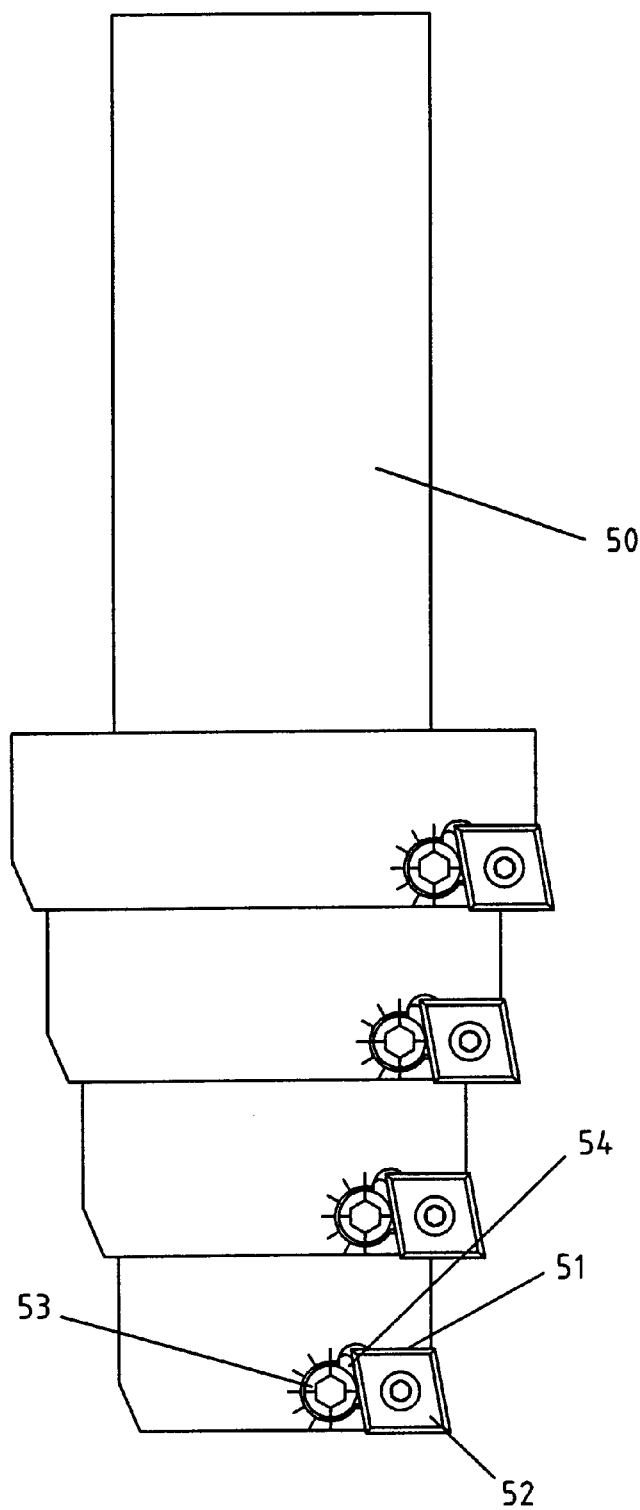
FIG. 14 is a plan view of a boring cutter assembly with a plurality of boring cutters.
Figure 15:
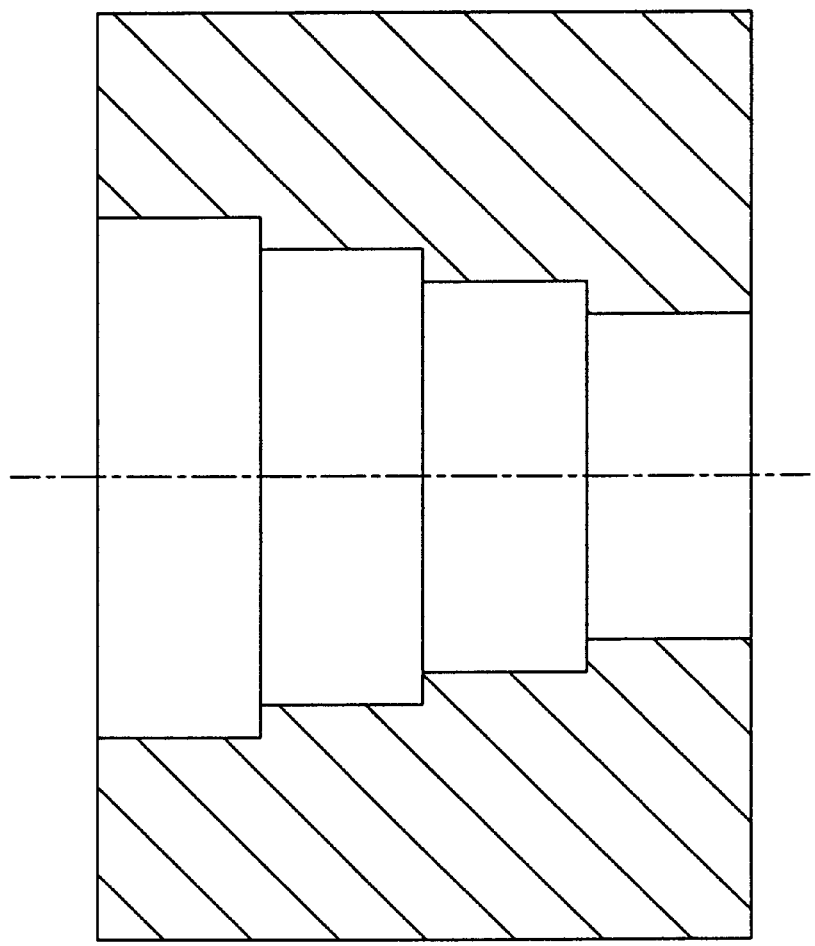
FIG. 15 is a sectional view of a workpiece bored by the boring cutter assembly in FIG. 14.
Figure 16:
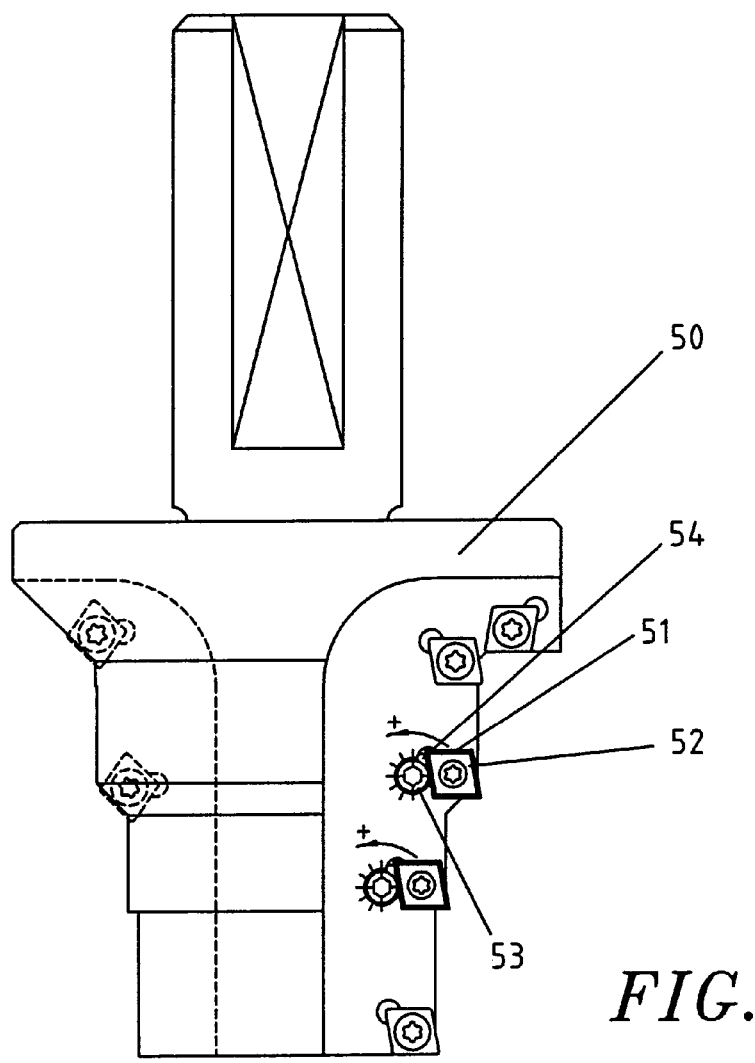
FIG. 16 is a plan view of another boring cutter assembly with a plurality of boring cutters.
Figure 17:
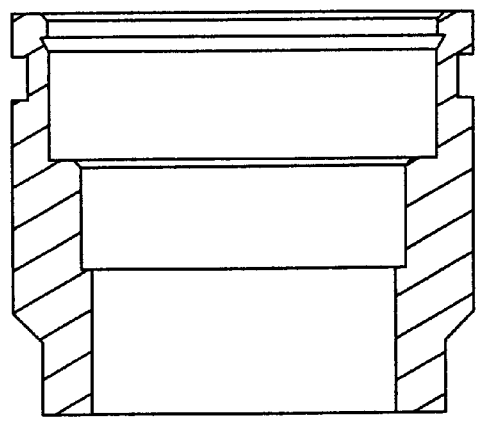
FIG. 17 is a sectional view of a workpiece bored by the boring cutter assembly in FIG. 16.

FIGS. 14 and 16 illustrate application of the boring cutter in accordance with the present invention, wherein the cutter shaft 50 are stepped with a cutter seat 51 formed on each stepped section. A blade 52 is mounted in each cutter seat 51 and secured by a screw (not labeled). A fine adjusting screw 53 and a gasket 54 are provided adjacent to each blade 52 for proceeding with fine adjustment for each blade 52, thereby properly adjusting the diameter of each bore to be formed. FIGS. 15 and 17 illustrate workpieces processed by the cutter assemblies in FIGS. 14 and 16, respectively. The processing is very fast when compared with the prior art. In addition, when the blade has wear, in addition to the normal fine adjustment in the bore diameter, the fine adjusting screw 53 may be adjusted to compensate the wear amount of the blade.

Figure 18:
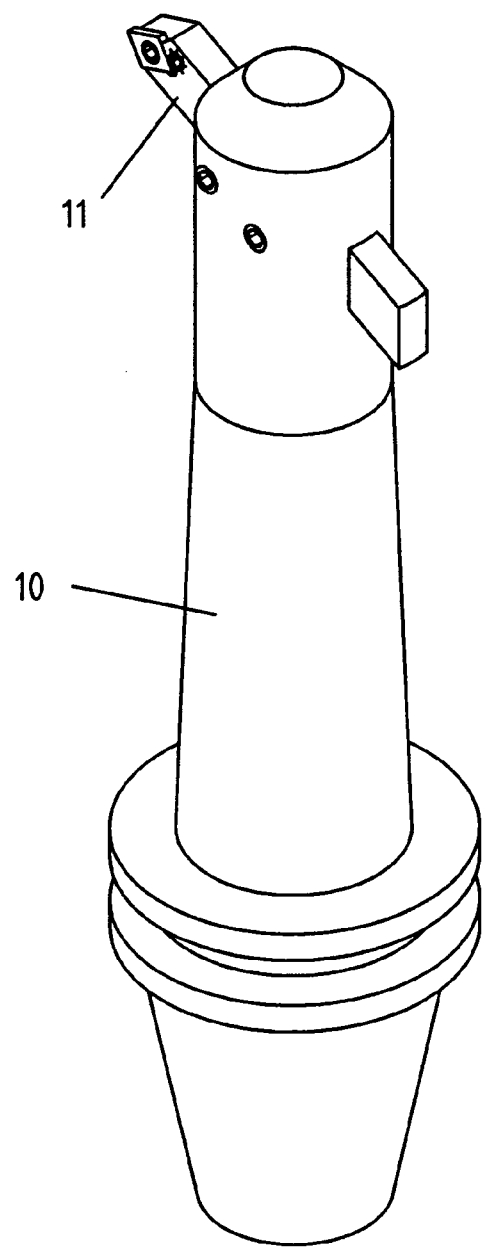
FIG. 18 is a perspective view illustrating application of the boring cutter in accordance with the present invention to a conventional boring cutting tool.
Figure 19:
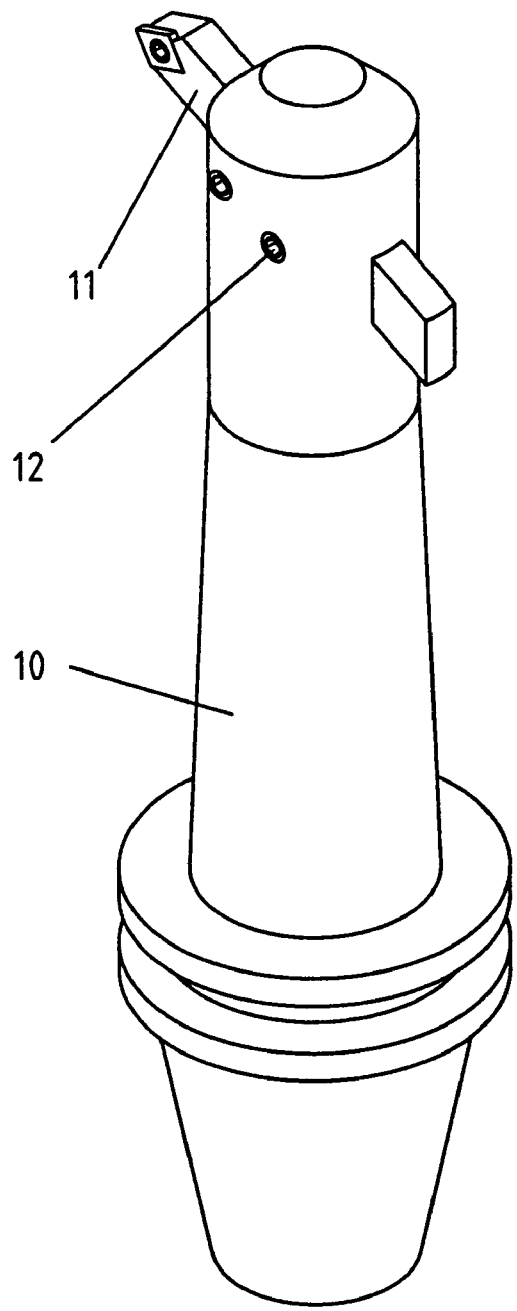
FIG. 19 is a perspective view of a conventional boring cutting tool.
Figure 20:
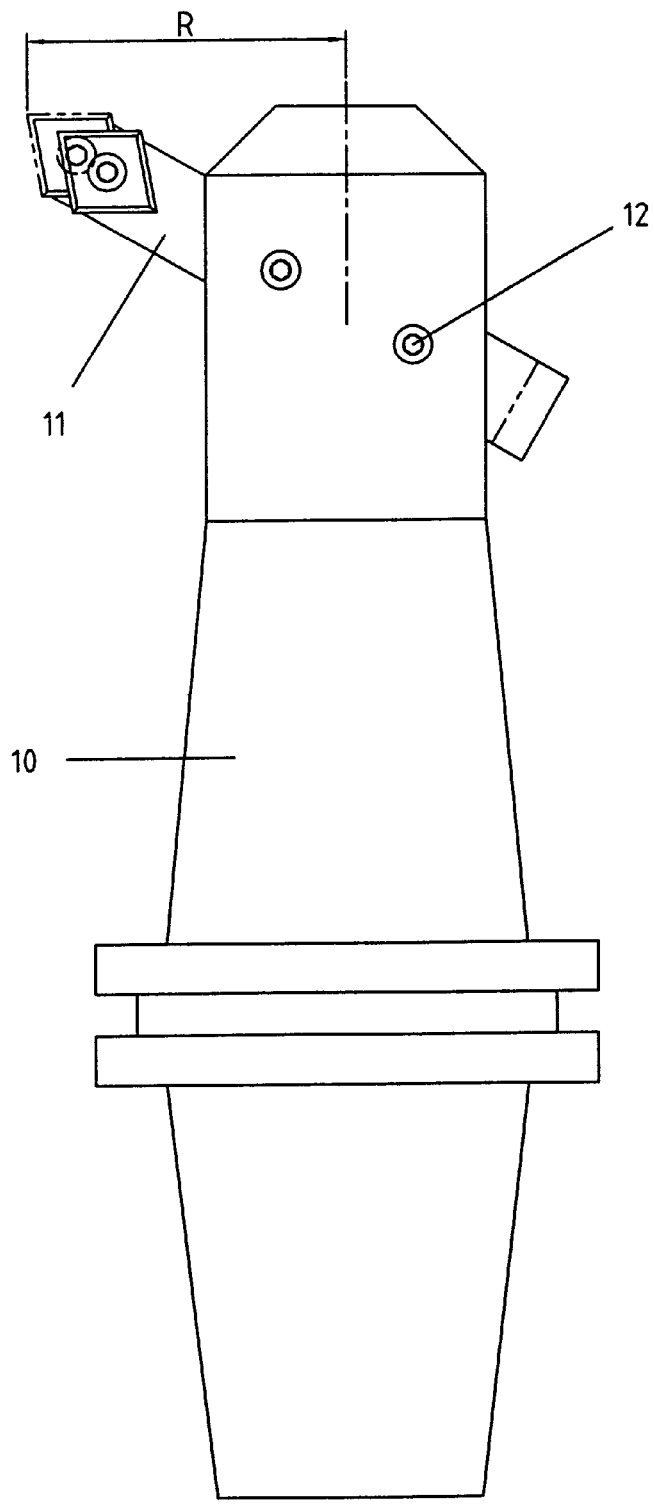
FIG. 20 is a plan view of the conventional boring cutting tool in FIG. 19.
Figure 21:
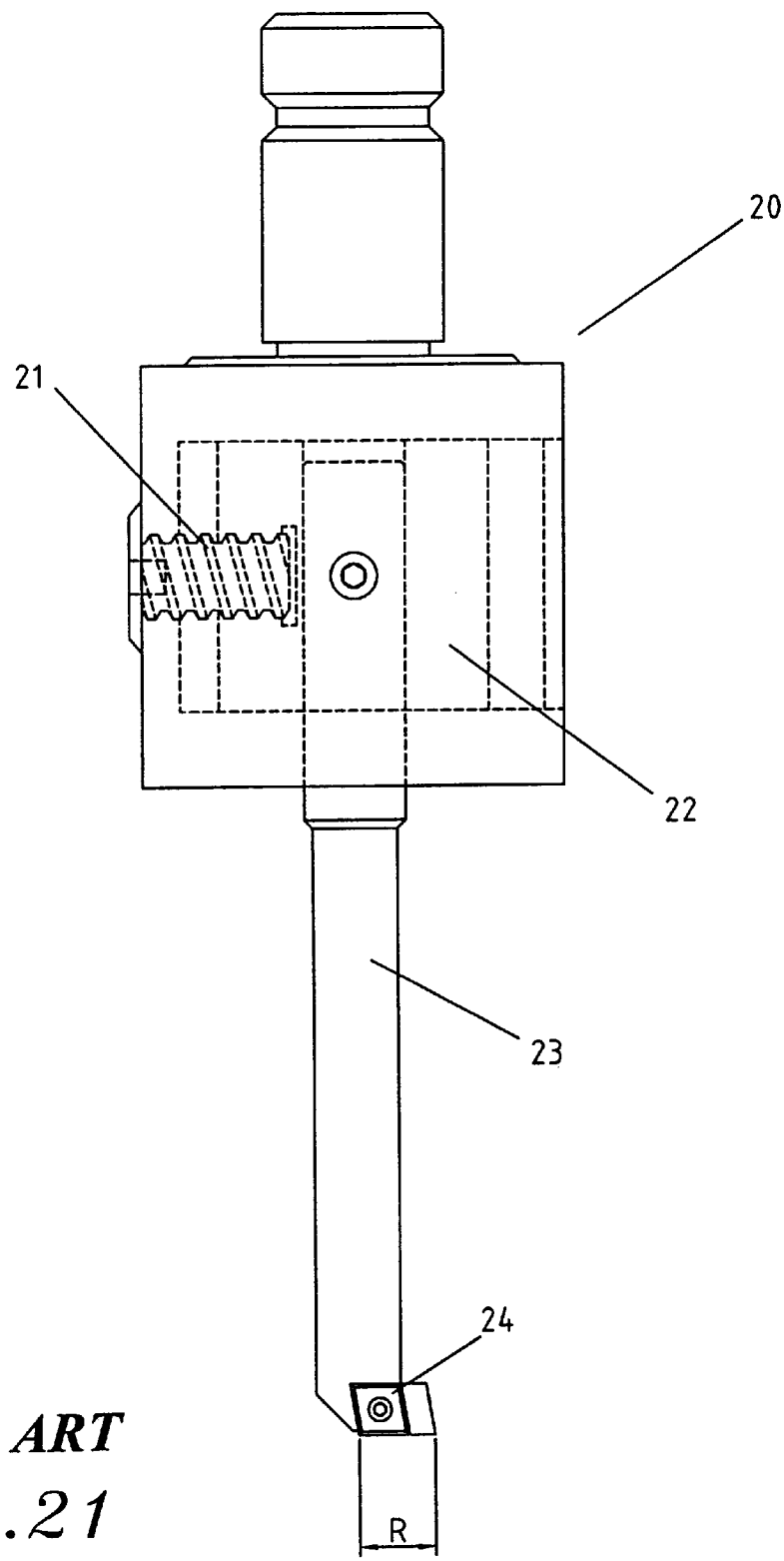
FIG. 21 is a plan view of another conventional boring cutting tool.

Referring to FIG. 18, the boring cutter in accordance with the present invention may be applied to an ordinary boring cutter 11 that is received in an inclined through-hole (not labeled) of the cutter shaft 10. Thus, a conventional boring cutting tool can be finely adjusted, thereby improving the boring efficiency and processing convenience. The processing efficiency is thus improved.

According to the above description, it is appreciated that the diameter of the bore to be formed can be finely adjusted in a rapid manner without using cutting tools that are difficult to control fine adjustment or that are expensive. Bores with tolerance can be directly bored. Production cost is reduced and processing speed is increased.

Although the invention has been explained in relation to its preferred embodiment, it is to be understood that many other possible modifications and variations can be made without departing from the spirit and scope of the invention as hereinafter claimed.

What is claimed is:

1. A boring cutter assembly with fine adjustment, comprising:

a cutter shaft having at least one cutter seat formed on a distal end thereof, said at least one cutter seat having a first threaded hole formed therein, said distal end of said cutter shaft having a counterbore formed adjacent said at least one cutter seat and a recess formed in a wall of said cutter shaft between said counterbore and said at least one cutter seat, said counterbore having an open side portion in open communication with said at least one cutter seat and said recess, said counterbore having a second threaded hole formed in a bottom wall thereof, said distal end of said cutter shaft having a first scale formed around said counterbore;

a fine adjusting screw having a head portion disposed in said counterbore and being threadedly engaged with said second threaded hole, said head portion having a top face with a second scale formed thereon for correspondence with said first scale and an annular groove formed circumferentially therein;

a blade disposed on said at least one cutter seat and having a conically shaped through hole aligned with said first threaded hole, said blade having a plurality of side walls inclined to define a clearance angle of said blade;

a substantially C-shaped resilient member engaging said fine adjusting screw within said annular groove, said resilient member having a distally disposed face inclined at an angle corresponding to said clearance angle of said blade and contacting one of said side walls of said blade, said inclined face having a stop extending therefrom and abutting against said wall of said recess to prevent rotative displacement of said resilient member as said fine adjusting screw is rotated, wherein rotation of said fine adjusting screw alters a height of said inclined face of said resilient member relative to said blade and thereby adjusts a lateral position of said blade; and, a securing screw passed through said conically shaped through hole of said blade and threadedly engaged with said first threaded hole, said securing screw having a conically shaped neck for coupling with said conically shaped through hole of said blade for retaining said blade to said at least one cutter seat.

2. The boring cutter assembly as recited in claim 1 wherein said cutter shaft includes a plurality of stepped sections, each stepped section having a cutter seat for receiving a respective one of a plurality of said blades.

* * * * *